United States Patent [19]

Bevis

[11] 4,056,849

[45] Nov. 1, 1977

[54] HIGH SPEED BUFFERED TAPE READER WITH LOW TAPE STRESS

[75] Inventor: Jeffrey M. Bevis, Long Beach, Calif.

[73] Assignee: Chalco Engineering Co., Gardena, Calif.

[21] Appl. No.: 616,548

[22] Filed: Sept. 25, 1975

[51] Int. Cl.[2] .......................... G06F 13/00; G06K 7/01; G06K 7/10; G11B 15/48
[52] U.S. Cl. ................................. 364/900; 250/570; 360/74; 235/458; 235/477
[58] Field of Search .................. 360/74, 90; 340/172.5; 178/17.5, 17 D; 235/61.11 E; 250/570

[56] References Cited

U.S. PATENT DOCUMENTS

| | | | |
|---|---|---|---|
| 2,987,249 | 6/1961 | Van Vechten | 235/61.11 E |
| 3,293,613 | 12/1966 | Gabor | 340/172.5 |
| 3,566,090 | 2/1971 | Johnson | 235/92 DP |
| 3,648,247 | 3/1972 | Guzak, Jr. | 340/172.5 |
| 3,743,839 | 7/1973 | Leis et al. | 250/570 |
| 3,766,529 | 10/1973 | McLaughlin | 340/172.5 |
| 3,818,461 | 6/1974 | Ward et al. | 340/172.5 |
| 3,836,891 | 9/1974 | McDaniel | 340/172.5 |
| 3,863,228 | 1/1975 | Taylor | 340/172.5 |
| 3,878,366 | 4/1975 | Austin | 235/61.11 E |

OTHER PUBLICATIONS

Skov, R. A. and Newman, E. G., "Buffer System," *IBM Technical Disclosure Bulletin*, vol. 2, No. 5, Feb. 1960, pp. 86-89.

*Primary Examiner*—Raulfe B. Zache
*Attorney, Agent, or Firm*—Julius L. Rubinstein

[57] ABSTRACT

A high speed tape reader has a buffer positioned between the read head output and the reader output which may be connected to the input of a data receiving station. When the data receiving station sends a signal to the tape reader that it has stopped accepting data, the tape reader slows gradually to a stop. While the tape is slowing, the characters on the tape move by the read head on the tape reader and these characters are read by the tape reader but instead of being transmitted to the data receiving stations, they are stored and accumulated in the buffer in the same sequence that the characters appear on the tape. Thereafter, when the data receiving station requests more data, the data is first taken off the buffer output in the same order it entered into the buffer to prevent the tape reader from skipping characters when it received the signal that the data receiving stations are no longer accepting data.

27 Claims, 8 Drawing Figures

HIGH SPEED BUFFERED TAPE READER WITH LOW TAPE STRESS

This invention relates to a tape reader, and more particularly, to a tape reader wherein a buffer is positioned between the tape reader and a data receiving station.

BACKGROUND IN BRIEF SUMMARY

In modern tape readers, information is stored on the tape in characters which are disposed in linearly spaced relationship along the tape. In the tape readers heretofore constructed, when the data receiving stations transitted a signal to the tape reader that it was no longer accepting data, the tape reader had to be able to stop very rapidly on the character that was over the read head when the signal was received. If the tape was not stopped very rapidly, the inertia of the tape driving mechanism would cause a number of characters, depending on the speed of the tape reader, to move by the read head. These characters were read when they moved by the read head, but the information could not be sent to the data receiving stations because those stations had already sent a signal that they would not accept data. Hence, these characters were lost.

The demand that the tape stop very rapidly and on character to prevent loss of data, subjected the tape to severe stresses which caused rapid tape deterioration. In addition, the tape reader had to be provided with complex and expensive braking mechanisms which added to their cost.

Furthermore, the requirement that tapes stop on character whenever the data receiving station sent a signal that it would no longer accept data, imposed limitations on the useful speed the tape reader could run.

The speed which data receiving stations can receive data varies widely because of their design and because of the equipment controlled by the data receiving station. Some stations can only receive data at a very slow rate, while others can receive data at a very high rate. Accordingly, it is desireable for the tape reader to have the capacity for high speed operation but to have sufficient controls so that it can operate at any speed which the data receiving stations require.

What is needed, therefore, and comprises an important object of this invention, is to provide a tape reader which can operate at various speeds and which can coast to a stop without losing any characters when the data receiving station fails to signal the tape reader that it wants data.

A further object of this invention is to provide a tape reader with a buffer positioned between the tape reader and the data receiving stations, which functions to store, in the proper sequence, characters on the tape which move by the tape head, thereby permitting the tape reader to slow the tape gradually to a stop and thus eliminate wear and tear on the tape when the data receiving station signals that it is no longer receiving data.

These and other objects of this invention will become more apparent when better understood in the light of the specification and drawings, wherein.

For purposes of illustration, the principles of this invention are described in connection with a fanfold perforated tape, however, it is to be understood that with appropriate modifications, the principles of this invention are also applicable to perforated tape mounted on tape reels and to magnetic tape.

Figure 1:
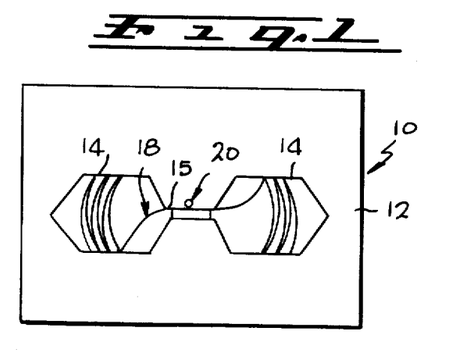
FIG. 1 is an elevational view showing the general arrangement of the tape reader constructed according to the principles of this invention.
Figure 2:
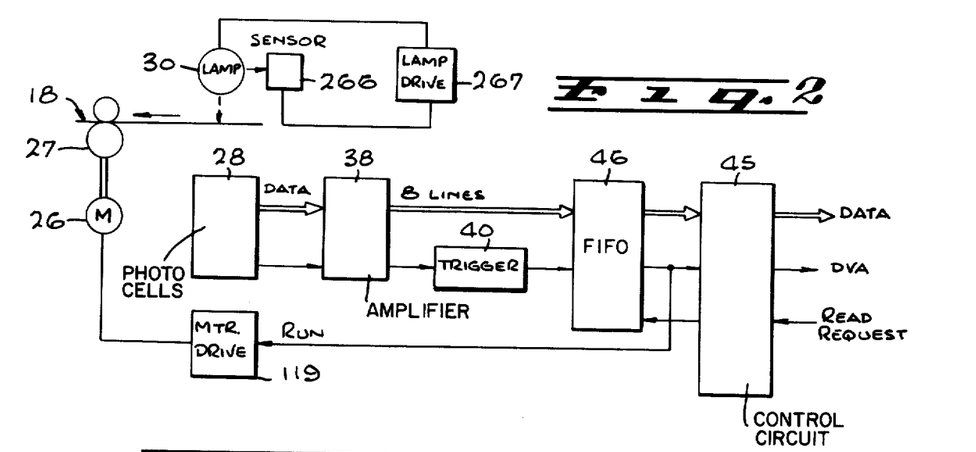
FIG. 2 is a block diagram of the tape reader constructed according to the principles of this invention.

Referring now to FIGS. 1 and 2 of the drawings, a tape reader indicated generally by the reference numeral 10 is mounted on a support or framework 12. Fanfold tape 18 passes from one bin 14 to another through a tape path 15 on the support. A tape read head 20 is also mounted on the support by the tape path.

Figure 3:
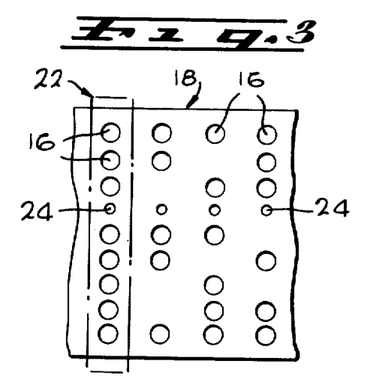
FIG. 3 is a plan view of a portion of the perforated tape used with this invention.

The characters 22 on the perforated tape 18, FIG. 3, are written in the form of eight possible perforation sites 16, written across the face of the tape with one sprocket or index hole 24 in line with each character. The absence of a perforation in a perforation site indicates a logical zero and a perforation in a perforation site indicates a logical one, in a manner well known in the art.

Figure 4:
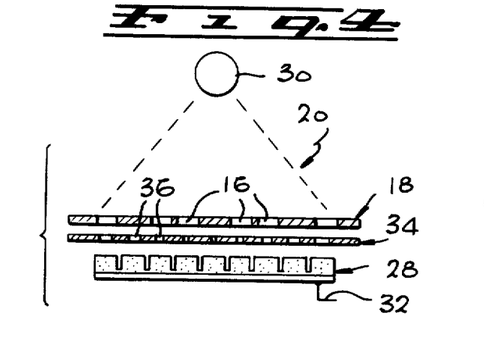
FIG. 4 is an elevational diagramatic view of the read head constructed according to the principles of this invention.

A tape transfer mechanism including a reversible motor 26, see FIG. 2, powers a capstan 27 which drives the tape through the read head 20, see FIG. 4. Since perforated tape is used, the presence or absence of a perforation in a perforation site (or a one or a zero in the character) is detected by photo cells 28 in the read head 20.

The photo cells 28 are in the form of an elongated strip and in this particular embodiment are disposed in the read head so that they are transverse to the tape and in line with each character as the tape 18 passes between a light source 30 and photo cell 28. Each photo cell is associated with a particular perforation site in the tape. With this arrangement, as each character passes over the read head, the photo cells under each perforation site will respond to the presence or absence of perforations by the amount of current they produce in a manner well known in the art, and each response or lack of response constitutes a character bit, except for the response of the photo cell beneath the sprocket or index hole 24. In this way, the photo cells convert the characters on the read head to an equivalent electrical signal.

In order to standardize the photo cells 28 so they all have the same characteristics and in particular, so they all respond to light in the same way, the photo cells 28 are formed from a single photo cell whose width is generally equal to the width of each character on the tape. The photo cell has opposed surfaces and in this embodiment one surface of the photo cell is partially cut into nine segments forming nine separate photo cells, with the opposite surface serving as common terminal 32, see FIG. 4. With this arrangement, each photo cell has the same physical and electrical characteristic. It is noted that other methods of treating the one surface of the photo cell to form separate photo cells besides cutting it into segments are possible, and are contemplated.

Figure 5:
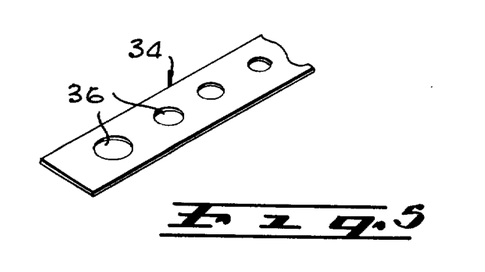
FIG. 5 is a perspective view of a portion of the collimating mask used with the read head in the tape reader.

Since the light source 30 is typically mounted over the center of the tape, the light entering the perforations at the ends of the tape will have a longer path length and consequently will have less intensity than the light entering the perforations directly beneath the light source. This could cause undesireable complications, and to prevent such problems from arising and to make certain each perforation across the width of the tape can transmit the same quantity of light, a collimating mask 34, see FIG. 5, is provided to collimate the light so light can only enter the photo cells when the tape 18 is in a predetermined position. This mask is interposed between the tape 18 and the photo cells 28, see FIGS. 4 and 5. The mask has collimating holes 36 which are positioned under each character site in the tape. The holes in the mask directly beneath the holes in center of the tape are smaller than the holes at the edge of the mask, and the increase in the size of these holes is calculated so that each hole in the mask transmits the same quantity intensity of light to all the photo cells. See FIG. 5.

Figure 6:
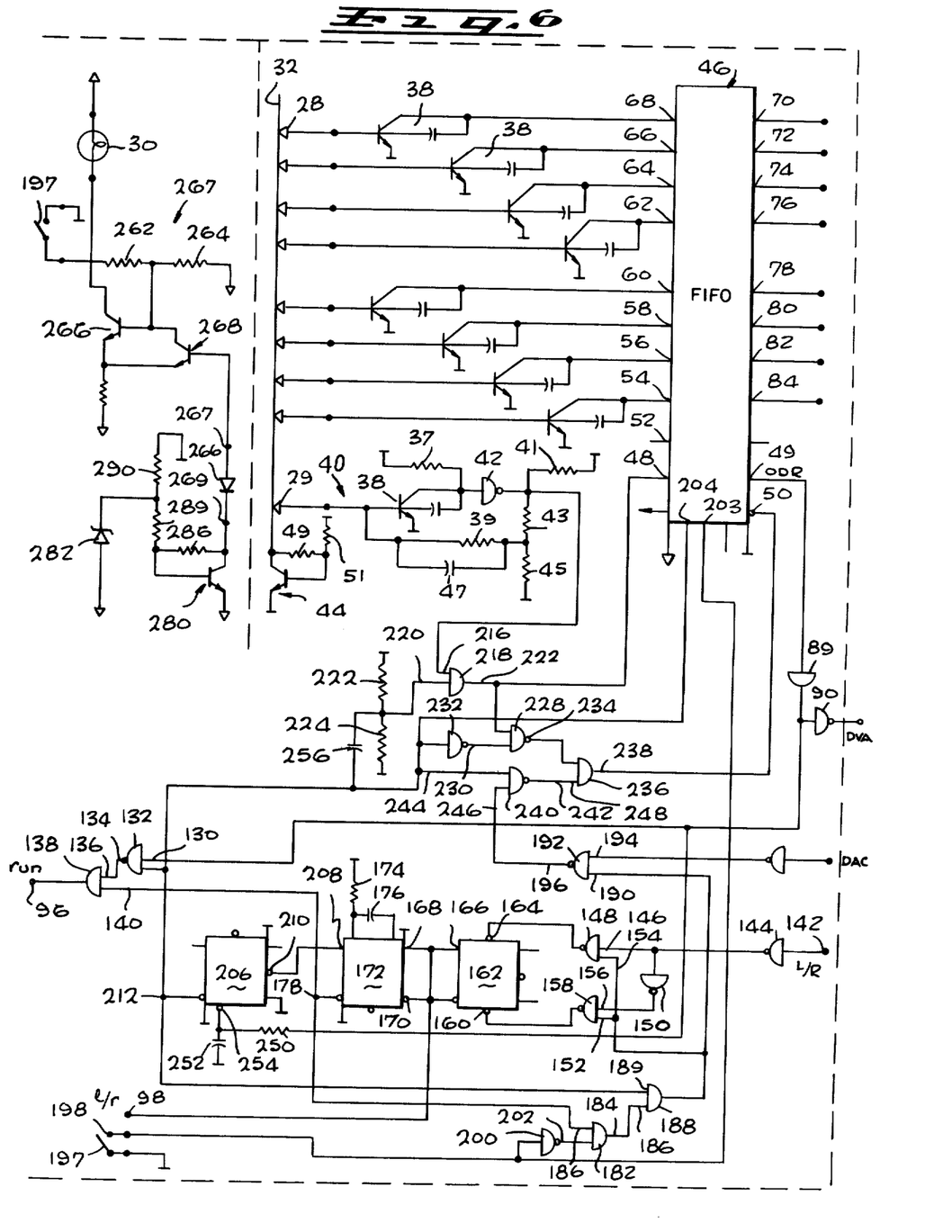
FIG. 6 is a circuit diagram showing the electrical connection of the tape read head to the buffer.

Since the electrical output of each photo cell 28 is small, they are each fed into generally conventional transistorized amplifiers 38, see FIG. 6. However, the photo cell 29 beneath the sprocket or index hole 24 is treated somewhat differently for reasons to become apparent below. The circuit 40 associated with the photo cell 29 is controlled by the sprocket or index holes 24 on the tape 18 and functions as the trigger circuit. In this embodiment the amplifiers associated with the remaining eight photo cells 28 invert the signals so that a logical one (hole) is a low level and a logical zero (no hole) is a high level, while the photo cell 29 and the transistorized amplifier 38 in trigger circuit 40 invert the signal twice, so that a logical one (hole) is a high level, and vice versa, for reasons to be described below. To do this an inverter 42 is required.

In addition, in order for circuit 40 to function as a trigger, it is desireable for its transistorized amplifier 38 to turn full on at a high rate when the sprocket hole 24 in the tape appears over the photo cell 29 and to turn full off at a high rate when there is no aperture and sprocket hole 24 over the associated photo cell 29. To do this a generally conventional positive feed-back arrangement is connected to the transistorized amplifier 38 comprising an 82K resistance 39 and a 0.00068 uf capacitance 41 in the control circuit 40. In addition there are various voltage regulating resistors connected in the trigger circuit 40 comprising a 1.8K resistor 43, a 1K resisitor 45, a 1K resistor 47 and a 22K resistor 37, as shown in FIG. 6.

This arrangement accelerates the response of the comparatively slow acting transistor 38 in trigger circuit 40. In this respect, the feed-back arrangement acts something like a mechanical toggle switch. In addition, by causing the transistor 38 in circuit 40 to turn completely on or completely off, noise, which could occur if the tape stops in a position such that the relationship of the sprocket hole 24 to the associated photo cell 29 is such that transisor 38 in trigger circuit 40 is ready to turn on or to turn off, is eliminated. Consequently the trigger circuit 40 will differ from the remaining eight channels or character circuits associated with each photo cell in that it will be faster acting and its output signal will be opposite in phase to the other channels.

Figure 8:
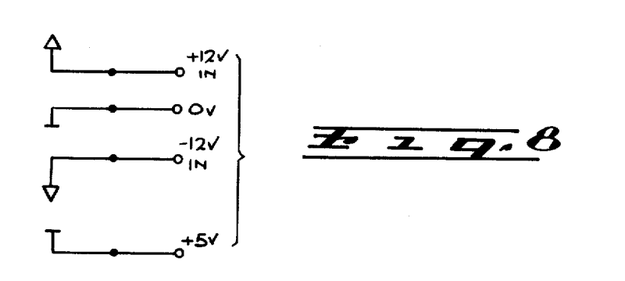
FIG. 8 is a diagramatic representation explaining the voltages corresponding to the symbols used in the circuit diagrams in this invention.

The output current of a photo cell is a function both of light and temperature. To eliminate temperature effects in the photo cells 28, there must be no voltage drop across the terminals of the photo cells. To do this, a circuit arrangement is provided wherein the collector of a transistor 44 is connected to the common terminal or cathode 32 of the photo cell strips 28 and the emitter of the transistor 44 is grounded. With this arragement, the amount of current required to flow through the collector of transistor 44 so it can function as a solid reference could cause the voltage of the cathode 32 to be somewhat higher than the voltage on the base of the various amplifying transistors 38. To prevent this from happening a resistor network comprising a 56 ohm resistor 49 and a 1.8K resistor 51 are connected to the base of transistor 44 and to the cathode 32 and to a +5 volt reference as shown in FIG. 6 and FIG. 8. The value of these resistors are computed so the voltage on the cathode 32 will be such that the voltage across the photo cells to the various bases of the transistors 38 will be zero. Consequently, the photo cells will respond only to light and not to temperature.

As stated above, the object of the invention is to provide a sort of electronic receptacle or buffer for storing characters on the tape in the correct sequence as they move by the read head 20 when the data receiving stations fail to signal the tape reader 10 that they are requesting data. For very high speed tape readers, it is necessary that such a character storing device operate electronically with no mechanical inertia. One kind of device which lends itself to this purpose is a solid state device having no mechanical inertia which is known commerically as a FIFO (First-in, First-out, or as a silo, register.) These are commercially available items and the one used in connection with this invention is designated as a FR 1502E made by the Western Digital Corporation. The structural and engineering details of this commercially available item can be obtained from the Western Digital Corporation at 19242 Redhill Avenue, Newport Beach, Calif. under their house publication entitled "Advance Engineering Information, No. FR 1502E". Such a device is fast acting (one megahertz) and accepts parallel data bits from the eight channels originating with the perforation sites on the tape and the corresponding photo cells. As data enters into the FIFO in the form of a one or a zero, at each channel, the data moves through the FIFO and stacks up at the output of the FIFO, making room for another character at the input. As seen in FIG. 6, eight of nine input terminals and eight of nine output terminals on the FIFO, one for each bit in a character, and one input 48 and output ODR (output data ready) terminal 49 for the sprocket or index hole, are used. In the present embodiment up to 40 characters may be stored in the buffer 46 at one time, and they are delivered upon demand in the manner to be described below to a data receiving station.

A mechanical analog of the FIFO would be something like a street car conductor's change-making device wherein coins (data) enter into a slot at the top (input) of the coin tubes and leave on demand at the bottom of the coin tubes (output) in the same sequence as they entered the coin tubes.

It is desireable for the tape reader to operate at various speeds ranging up to 1,000 characters per second (i.e., 1,000 linearly spaced characters move by the read head each second). If when this tape reader is moving at this speed no signal is received from the data receiving station requesting data, the motor 26 will bring the tape 18 to rest while something like 25 characters move by the read head 20. By not imposing a requirement on the tape reader that it stop the tape on character, each time the data receiving station fails to transmit a signal that it is requesting data, the stress and strain on the tape will be substantially reduced and is durability will be increased. In this embodiment, the electrical equivalent of the characters on the tape which moved by the read head while the motor is coasting to a stop are stored in sequence in the buffer of FIFO 46. Later, as will be described below, the data stored in the buffer will be read out in proper sequence when data again is requested.

In summary to this point, as each character on this tape goes by the read head 20, depending on whether there is a perforation or not at each perforation site on the character line of the tape, the corresponding photo cell will deliver current corresponding to a hole or not current corresponding to the absence of a hole at the perforation site. The presence or absence of current is transformed by the associated transistors to a low voltage at the corresponding input terminal of the buffer (for current in the photo cell) or a high voltage at the input terminal of the buffer (corresponding to no current in the photo cell). In addition, for reasons to be described below, the trigger circuit 40 delivers voltages in the form of highs or lows to the input strobe terminal 38 of the FIFO 46, or in another operational phase, to the output strobe terminal 50.

The buffer or FIFO 46 operates in such a way that each time a signal in the form of a high (which is the reason an inverter is required in the trigger circuit 40) appears at the input strobe terminal 48 of the buffer, it acts as a switch for the FIFO, latching the characters at the input terminals 54, 56, 58, 60, 62, 64, 66, and 68 into the FIFO. Then when the voltage at 48 goes low, the latched character at the input of the FIFO moves through the FIFO, and stacks up in sequence, at the output terminals 70, 72, 74, 76, 78, 80, 82, and 84. The appearance of a sprocket hole 24 in line with each perforation site, over photo cell 29, produces the voltage high which latches the character formed by the data bits at the input terminals. When the sprocket hole moves away from its position over photo cell 29, a low appears on the input strobe terminal 48 which causes the latched character to move into the buffer and stack up at the output.

The FIFO is constructed so data appearing on the output terminals of the buffer is cancelled in sequence each time the output strobe terminal 50 goes low, but before the data at the output terminal of the buffer is cancelled, it has appeared in the data receiving stations. The FIFO functions so that data in the form of highs or lows enters the FIFO in synchronization with the signal from the sprocket hole 24, and then stacks up at the output independently of the sprocket signal. In order to determine when a character is present at the output of the buffer, the output terminal (ODR) corresponding to the output of the input strobe terminal 48 of the buffer will appear as a high because of the construction of the FIFO. This characteristic is used to determine when the data at the output of the buffer is valid because a high detected on the output terminal (ODR) means all the remaining data on the other eight channels is present at the output terminal of the buffer, while a persistant low at terminal ODR means that there is no character on the output terminals of the buffer or character storing device, and hence the buffer is empty. However, as each character is cancelled from the output terminals of the buffer, terminal ODR drops to a low momentarily (500 × 10⁻⁹ seconds).

The signal from terminal ODR is first amplified by amplifier 89 and then inverted by inverter 90 and fed to the data valid terminal, DVA. A low signal, logical one, indicates to the data receiving station that valid data is present on the eight data lines, and may be recorded by the receiving station.

If as stated above, the data stored in the buffer is cancelled in sequence, on the output terminal of the FIFO, each time the output strobe terminal 50 goes low, the characters in or moving through the FIFO will be cancelled when they appear at the output of the FIFO (and also at the data receiving stations) by simply connecting a low voltage signal to the output strobe terminal 50 directly from the DAC terminal (Data Accepted). This low is the signal from the data receiving station that it has accepted the old data and is requesting new data.

Under some circumstances, depending upon the equipment controlled by the tape reader and the data receiving station, it is desireable to be able to drive the tape 18 through the tape read head 20 in the opposite direction, and this creates substantial complications in the system described because of the characters which might be stored in the buffer. For example, suppose the characters in the tape are numbered for purposes of identification from 1 to 110, and suppose after character number 100 has moved through the reader and has been received by the receiving station, the system is required to reverse direction. Because of the tape speed, however, before the tape can stop and start to reverse its direction, additional characters will have entered into the buffer. Suppose the next ten characters, after character number 100, have moved beyond the tape head—for example, characters 101, 102, to 110, are in the buffer. If the tape direction was reversed after character 100 is received, the system would expect to get back characters 99, 98, and so forth. However, because of the FIFO 46 in the system, the characters actually delivered would be 101, 102, ... to 110, 109, 108, ... 101, 100, 99, 98, etc., because characters 101 through 110 were stored in the buffer or character storing device when the tape stopped, and characters 109, 108, ... 100 would be re-read and stored in the tape as the tape began travelling in the opposite direction. As will be explained below, this tape reader is designed to prevent this from happening.

To start with, however, the motor 26 in the tape reader would have to be reversible, and a reversing control circuit indicated generally by the reference numeral 45 (see FIG. 7) would be required. In this embodiment, the motor 26 is a conventional reversible DC motor which is driven by a motor drive 119, FIG. 2, in the form of a transistorized bridge circuit, see FIG. 7.

Figure 7:
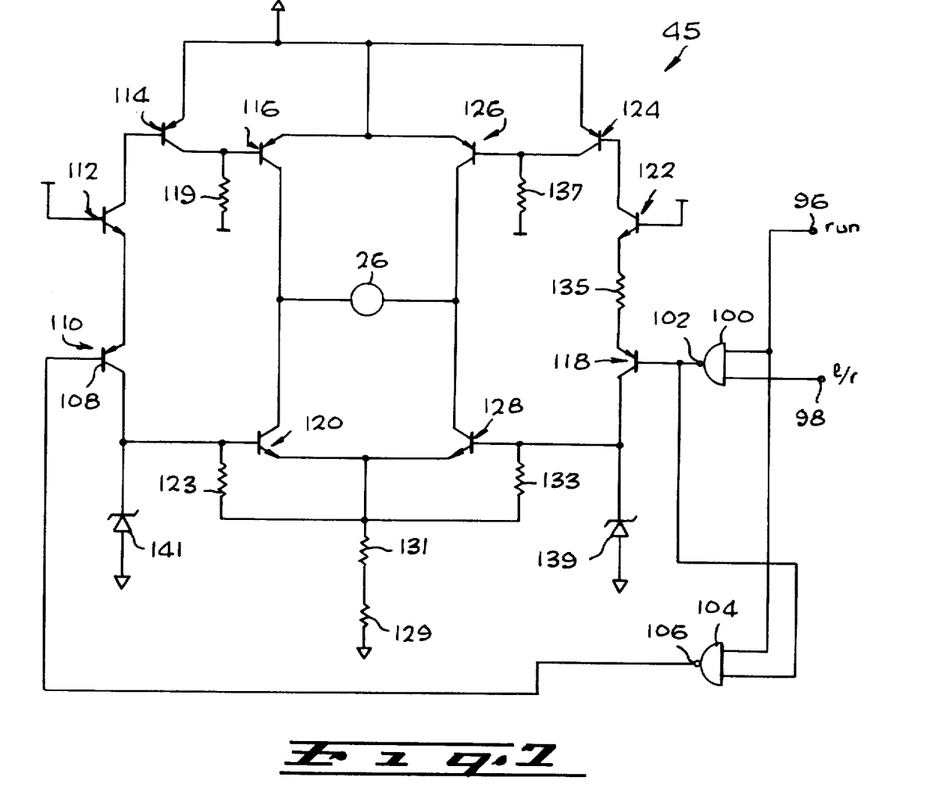
FIG. 7 is a circuit diagram of the motor control.

As seen in FIG. 6 and FIG. 7, the motor controls comprising run terminal 96 and the left/right terminal 98 (1/r) are connected to the input of a NAND gate 100. If terminals 96 and 98 are both high, then the output of the NAND gate 100 would be low. If the output 102 of the gate is low, then the output 106 of the NAND gate 104 would be high. If 106 is high, then the base 108 of the PNP transistor 110 goes high, and this turns the transistor 110 off. When transistor 100 goes off, the voltage on the emmitter of the NPN transistor 112 changes and it goes off. Since the collector of transistor 112 is connected to the base of PNP transistor 114, it goes off, too. However, when transistor 114 goes off, it allows PNP transistor 116 to turn on because the base of transistor 116 is pulled down by the 10K biasing resistor 110. However, when transistor 116 turns on, the NPN transistor 120 in the bridge turns off because transistor 110 is off, and because of the biasing effect of the 3.9K resistor 123.

However, when terminal 102 of NAND gate 100 goes low, it also makes the base of the PNP transistor 118 go low, turning it on. This in turn causes PNP and NPN transistors 122 and 124 to go on. This in turn causes transistor 126 to go off, while transistor 128 goes on completing the circuit through the motor, permitting it to rotate, counter clockwise, and drive the tape to the left.

If the run terminal 96 goes low, terminal 102 goes high, turning off transistors 118, 122 and 124. However, terminal 106 of NAND gate 104 stays high. When transistor 118 goes off, transistor 128 goes off, while transistor 126 goes on. Since terminal 106 stays high, the transistor 108, 112 and 114 behave as before, so transistor 116 stays on. This in effect causes a short across the motor, through transistor 116 and 126, giving the motor dynamic braking so it stops faster bringing the capstan and the tape to a rapid but gradual stop, thus avoiding destructive stresses on the tape. Consequently, this portion of the circuit functions as a stopping means for the tape transfer mechanism.

In reversing the direction of the motor, control terminal 98 is made to go low. Consequently, terminal 102 goes high, turning transistor 126 on, and in this case, causing terminal 106 to go low, turning on transistors 110, 112 and 114, so transistor 116 goes off, and transistor 120 goes on. When transistor 120 and 126 are on, the circuit through the motor is completed and the motor rotates in a reverse direction.

To cause the various transistors to operate, in this way, current limiting resistors comprising 5.1 ohm resistor 129, a 5.1 ohm resistor 131, and biasing resistors comprising 3.9K resistor 133, a 3K resistor 135, and a 10K resistor 137, along with the Zener diodes 139 and 141 which regulate the bases of transistors 128 and 120, are connected to the various transistors of the motor control circuit, as shown in FIG. 7.

There is no point in operating the tape reader, and hence the motor 25 at a speed faster than the data receiving stations can pick up the data appearing on the output of the buffer. Also, there is no value in operating the motor of the tape reader at a slower speed than the data receiving stations can receive data. The motor speed must be controlled so it moves the tape 18 and hence delivers data to the buffer at the same average speed at which the data can be received, although the two instantaneous speed may differ. This is possible because the buffer 46 provides an equivalent of mechanical slack in the tape.

As stated above, motor 26 turns on when terminal 96 is high. The feedback arrangement by which the rate data is removed (cancelled) from the output of the buffer 46 and the way this indirectly controls the motor speed 26 will become apparent below. It will be recalled that the terminal ODR goes low each time data is removed from the buffer. However, if the buffer has characters stored inside, the terminal ODR only stays low for about $500 \times 10^{-9}$ seconds, which is too short a time to have any effect on the motor. However, in this embodiment, after the last character is removed from the buffer (or in some circumstances when the number of characters stored in the buffer falls below a predetermined minimum) terminal ODR stays low. This causes the motor 26 to start which delivers more tape to the read head and this causes more characters on the tape to move through the FIFO to the data receiving station.

To do this, the terminal ODR is connected via amplifier 89 to terminal 130 of the NAND gate 132. Consequently, since 130 is low, the output terminal 134 of the NAND gate 132 will be high. This output terminal 134 feeds into the input terminal 136 of AND gate 138 while terminal 140 of the AND gate 138 will be normally high (with certain exceptions to be described below). Consequently, the output terminal 96 of gate 138 is high and the motor 26 will run.

When the motor runs, it drives the tape past the read head so more characters move into the buffer driving ODR high thus stopping the motor.

The rate at which the characters are cancelled from the output of the buffer (remembering that the characters on the output of the buffer appear simultaneously at the data receiving stations where they are recorded) so that the next character can appear, depends on the pulse rate of terminal DAC. Consequently, the rate at which data is accepted determines the average motor speed.

As stated above, terminal 140 of gate 138 is normally high. However, during a reversing sequence it goes low for 300 milliseconds for reasons to be described below. This cuts off power to the motor for this period and gives the motor 26 time to stop an prepare to reverse direction.

To initiate a reverse sequence, left/right terminal 142 (1/r) is made to change state (go high or low). If, for example, terminal 142 goes low, then the output of inverter 144 goes high and the input terminal 146 of NAND gate 148 goes high. At the same time, input terminal 156 of NAND gate 158 goes low because of the inverter 150.

Terminals 152 and 154 of NAND gates 148 and 158 are normally high, consequently, the input terminal 160 of the flip-flop 162 goes high while input terminal 164 goes low.

If the sequence were reversed and terminal 142 went high, then terminal 146 of NAND gate 148 goes low so terminal 164 goes high. At the same time, terminal 156 goes low so input terminal 160 goes low. In the first instance, output terminal 166 of flip-flop 162 goes low and in the second instance it goes high. Terminal 166 is connected to the motor control circuit terminal 98 and operates to change the direction of motor rotation as described above.

The ouput terminal 166 of the flip-flop 162 feeds into terminals 168 and 170 of the one-shot time delay 172. When output terminal 166 changes its state for a motor directional change as explained above, a time delay is required to permit the motor to stop, if it is running, before it reverses direction. Consequently, the one-shot 172 is provided with a timing circuit comprising a 47K resistor 174 and a 20 uf capacitor 176 connected as shown in FIG. 6.

This timing circuit causes the output terminal 178 of the one-shot 172 to go low for 300 milliseconds which causes terminal 140 of the AND gate 138 to go low, shutting off power to the motor for that period.

At the same time, if terminal 178 goes low, it makes the input terminal 180 of AND gate 182 to go low, thereby causing the output terminal 184 to go low. This in turn causes input terminal 186 of AND gate 188 to go low which in turn causes the input terminal 190 of NAND gate 192 to go low. When this happens, terminal DAC which is also connected to the input terminal 194 of NAND gate 192 becomes ineffective because the output terminal 196 of NAND gate 192 remains high during this period regardless of the state of DAC. This is to prevent signals from the DAC terminal from confusing the circuit during this transition state.

In operation, control switch 197, in the run position, connects terminal 98 to ground. This causes terminal 198 to be low, thereby causing the inverter 200 to provide a high input at terminal 202 of AND gate 182 so its output is high (except for the brief period of 300 milliseconds when the time delay one-shot drives terminal 178 low). At the same time, a low is connected to terminal 203 of the FIFO. This terminal, when high, has a characteristic such that it cancels all the characters left over in the buffer from the preceeding operations, permitting fresh data to be stored in the buffer.

Once the motor 25 starts operating in the reverse direction, it will naturally drive the tape 18 in the reverse direction, and each time a sprocket hole 24 in the tape moves by photo cell 29, the character in line with the sprocket hole would normally be latched into the buffer. However, as stated above, some of these characters are already stored in the buffer because the motor coasted to a stop when the DAC terminal failed to request information. Using the example stated above, assume that ten characters are stored in the buffer, (i.e., characters 101–110) when the motor 26 coasted to a stop. Consequently, when the motor drives the tape 18 in the opposite direction, the first character which would ordinarily be latched onto the buffer when the tape reverses direction would be Character 110, followed by Character 109, etc., which were already stored in the buffer. To prevent this from happening, advantage is taken of a characteristic of the FIFO which has an input enable terminal 204 which controls the functioning of the input strobe terminal 48. When the input enable terminal 204 is low, the input strobe terminal 49 becomes ineffective in the FIFO.

To use these characteristics, an abort flip-flop 206 is connected to the output terminal 208 of the one-shot 172 at its input terminal 210. The abort flip-flop 206 is connected in the circuit so its output terminal 212 is normally high. However, when the input terminal 210 of the abort flip-flop goes low by the operation of the one-shot 172, the abort flip-flop changes state driving terminal 212 low. This terminal is connected directly to the input enable terminal 204 of the buffer making the input strobe terminal 48 ineffective, as the tape moves in the reverse direction. This is important because the characters stored in the buffer (e.g., Characters 101 – 110) must be drained or cancelled out of the bufrer before the buffer can again accept characters when the tape moves in the reverse direction. Since characters are stored in the buffer as explained above, terminal ODR of the buffer remains high except for short time periods (500 × $10^{-9}$ seconds) each time a character is cancelled. However, as stated above, these very short time periods have no effect on the motor 26. As seen, terminal 212 of the abort flip-flop is connected to the input terminal 214 of the NAND gate 132, so if terminal 212 goes low, terminal 134 stays high and the motor terminal 96 stays high so the motor runs, even though terminal ODR is high. In the reverse direction, after the last character is removed from the buffer, ODR goes low resetting the flip-flop. However, the motor continues to run, because terminal ODR makes the input terminal 130 of NAND gate 132 low. Except for the brief period when the abort flip-flop changes state, driving 212 low, terminal 212 remains high, so the absence of a character in the buffer or character storing device operates to keep the motor running.

However, in order to cancel or remove the characters in the buffer, each time the associated sprocket hole 24 of the tape 18 moves by photo cell 29, the output strobe terminal 50 must go low regardless of the tape direction.

To do this in the reverse sequence, the input strobe terminal 48 is disabled as described above. However, the trigger circuit 40 output terminal 216 goes high, regardless of tape direction, each time a sprocket hole 26 goes over photo cell 29 and goes low when there is no sprocket hole over the photo cell. When the terminal 216 goes high, ordinarily, the input strobe terminal 48 latches the character associated with the sprocket hole onto the buffer input and then when the terminal 216 goes low, (after the sprocket hole moves away from the photo cell) terminal 48 goes low and the FIFO 46 moves the latched character at the input of the FIFO into its stacking order at the output of the buffer as explained above. However, all this becomes ineffective during the reverse sequence because the input strobe terminal 48 is disabled as explained above. Nonetheless, each time a sprocket hole 20 goes over photo cell 29, terminal 216 goes high and this terminal is one input of the AND gate 218. Its other input, terminal 220, is kept high by means of a divider network comprising the 2K and 3K resistors 222 and 224 which are connected as shown in FIG. 6 between ground and 5 volts. Consequently the output terminal 222 is high and this terminal is the one connected to the input strobe terminal 48 to drive it high each time a sprocket hole moves by the read head. However, as explained above, terminal 48 is disabled during the reverse sequence. In such a situation the output terminal 22 is also the input of the NAND gate 228. The other input 230 is connected to the abort flip-flop 206 terminal 212 through an inverter 232. With this arrangement, when terminal 212 goes low the terminal 230 of the NAND gate 228 goes high so the output terminal 234 of the NAND gate 228 is now dependent on the sprocket signal 222 from gate 218. The output terminal 234 of the NAND gate 228 is the input of the AND gate 236 and when terminal 234 is low, the output terminal 238 of the AND gate 236 goes low. This terminal, however, is connected to the output strobe terminal 50 of the FIFO 46, so each time a sprocket hole moves by the read head during the reversing sequence, the character stored in the FIFO at the output terminals is cancelled, while the input strobe terminal 48 remains ineffective. Terminal 212 of the abort flip-flop 206 is also connected to the terminal 244 of the NAND gate 240. When terminal 212 is low, the output terminal 242 of the NAND gate 240 is high, rendering terminal DAC ineffective, since terminals 244 and 246 of the NAND gate 240 both must be high for the output strobe terminal 50 to go low to cancel the character. This prevents a DAC signal from confusing the buffer during the reversing sequence.

When the last character is removed from the buffer while the tape is being driven in a reverse direction, terminal ODR goes low, and remains low. Terminal ODR is connected to a filter network comprising a 300 Ohm resistor 250 and a 0.01 microfarad capacitor 252 at the reset terminal 254 of the abort flip-flop 206. The filter network comprising elements 250 and 252 is used to eliminate the short-time (500 × $10^{-9}$ seconds) low which occurs each time a character is cancelled at the output of the FIFO. When terminal ODR stays low long enough the abort flip-flop is reset, causing terminal 212 of the abort flip-flop to go high.

This, in turn, causes the input enable terminal 204 of the FIFO to go high so the input strobe terminal 48 now becomes effective so that characters associated with the succeeding sprocket holes are latched into the FIFO, and at the same time the DAC terminal 50 path is reinstated so the DAC terminal becomes effective to demand operation of the tape reader.

Consideration must now be given to a problem which could occur if the tape stops on character 110 and that character is entered into the FIFO but the entry process has not been completed. Under these conditions, terminal 216 of the AND gate 218 would remain high and the character would be latched into the buffer. But during the reversing sequence, since a character is removed each time terminal 216 goes high, then one low to high transition would be missed. By the time the buffer was empty, character 99 would have passed the read head, and character 98 would be the first character entered into the buffer, that is character 99 would be lost.

To prevent this form happening, the low-going transition at terminal 212 of the abort flip-flop 206 is coupled through capacitor 256 to input terminal 220 of gate 218, which is normally high as a result of voltage divider 222 and 224. This provides an extra pulse or low in the AND gate 218 each time the abort flip-flop is set. If the tape does not stop on character, the extra pulse would not be effective since terminal 216 of the AND gate 218, serving here as a switch, would be low, but if it does stop on character, terminal 216 of AND gate would be high and the discharge of the capacitor 256 when terminal 212 of the abort flip-flop goes low will drive the output strobe terminal low cancelling one more character in the buffer and solving this problem. Without this arrangement, the above described tape reader would be unreliable.

As stated above, this tape reader uses perforated tape but there is no standardization in perforated tape in use so that the different variations of tape on the market are translucent to varying degrees. Also, the light from the lamp varies with age. This could create substantial problems because if the tape is too translucent the photo cell would not be able to distinguish between a perforation and no perforation at a perforation site. Consequently, the brightness of the lamp 27 must be controlled by a feed-back regulating circuit or lamp drive 267. As shown in FIG. 6, the lamp 27 is connected in series with a regulating transistor 260 and a biasing resistor 261. When switch 197 is closed the base of transistor 260 is pulled up because of the divider network comprising the 10K resistor 262 and 264 which turn NPN transistor 260 on so that the lamp can light up. However, after the light from the lamp 27 hits the associated photo cell 266 it generates a current through the photo cell. This current flows into the base of NPN transistor 268 which turns this transistor on. However, when transistor 268 turns on, transistor 260 turns off, cutting off power to the lamp. When power to the lamp is cut off, the lamp starts to dim. However, this decreases the current in the photo cells which turns off transistor 262 and turns transistor 260 on, restoring power to the lamp so the lamp begins to brighten again. If the lamp dims with age, less current will be generated at this photo cell so that more current will flow through the lamp 26 causing it to brighten. To regulate the correct level, a set screw (not shown) is connected in the path of the light to get the exact amount of light required to permit the photo cells to distinguish between light passing through perforations and light passing through the material of the tape.

In order to make the photo cell 266 independent of temperature, as explained above, the voltage across its terminals must be zero. In the circuit described in FIG. 6, it happens that terminal 267 of the photo cell is 0.55 volts above the −12V bus. As stated above, we want terminal 269 of the photo cell to be equal to this. To do this, NPN transistor 280 is connected as shown. In addition, to provide a more stable voltage source, the Zener diode 282 provides a 5-volt reference above the unregulated −12 volt bus. The base of transistor 260 is supplied from the 5 volt source through the 1.8K resistor 284. However, most of the current passing through resistor 284 goest through the 56 ohm resistor 286 to the collector of transistor 280. Since the base voltage, with respect to its emitter, is substantially constant, the collector voltage is also substantially constant, and somewhat less than the base voltage as a result of the drop through resistor 286. This provides a voltage of 0.55 volts above the unregulated −12 volts on the collector of the transistor 280 which is what we want to make the photo cell 266 independent of temperature. The 680 ohm resistor 290 shown in the drawings functions to limit current to the Zener to its proper operating value. The automatic regulating means described above functions as indicated so the response of the photo cells is independent of factors affecting the light generated by said light source and factors affecting the components of the circuit.

It is understood that the various voltages required by the circuit, and indicated by the symbols in FIG. 8, are provided by any suitable voltage source in a manner well known in the art. These voltages are normally maintained in the circuit even when the tape reader is not in use.

To operate the tape reader, switch 197 is moved to the run terminal 198, starting the motor. This switch is also connected mechanically to terminal 199 in the lamp circuit so the lamp lights up. The direction of motor rotation depends on whether or not a high or low voltage level is applied to terminal 142 and the direction of motor rotation or tape direction may be selected by changing the voltage level on terminal 142 to a high or low, as described above. The tape reader will stop when no more low voltage pulses are received on terminal DAC or when switch 197 is moved off terminal 198 to the off position. It is noted when switch 197 is moved to the off or open position terminal 203 of the buffer or character storing device goes high, automatically cancelling all the characters, if any, remaining in the character storing device. In this way, when the tape reader is again used, the tape reader starts with the buffer or character storing device empty.

Having described the invention, what I claim is new is:

1. An apparatus of the class described comprising a support, a tape transfer mechanism mounted on the support, a tape path on the support, a tape read head mounted on the support and associated with said tape path for reading characters on the tape that move by the read head, said tape transfer mechanism having a tape starting means and a braking means of the kind which operates to gradually stop the tape transfer mechanism and the tape without destructive stresses on the tape whereby when the braking means operates a number of characters on the tape move by the tape read head and are read by it, character storing means operatively associated with said tape read head for storing in sequence any characters on the tape that move by the tape read head when the braking means is gradually bringing the tape transfer mechanism and the tape to a stop, and means connected to the character storing means for recovering the stored characters in the character storing means when operation of the tape transfer mechanism is resumed.

2. The apparatus described in claim 1 wherein said means for recovering the stored characters on the tape include means on said character storing device adapted to receive signals from a data receiving station for transfer of the stored characters to said data receiving station, control means connected to said character storing device for causing the tape transfer mechanism to operate automatically to move additional tape past said read head when the number of characters stored in the character storing device is reduced below a predetermined minimum by transfer of the stored characters to said data receiving station, whereby when said data receiving station sends signals to said means on said character storing device, the character storing device transmits said stored characters in sequence to said data receiving station until the number of characters in the character storing device falls below a predetermined minimum whereupon said tape transfer mechanism moves more tape past said read head causing the characters on said tape to move through said character storing device to said data receiving station following said stored characters as long as the data receiving station is requesting data.

3. The apparatus described in claim 1 wherein said character storing means is an electronic character storing device having no mechanical inertia.

4. An apparatus of the class described comprising a support, a tape transfer mechanism mounted on the support, a tape path on the support, a tape read head mounted on the support and in said tape path for reading characters on the tape that move by the read head, said tape transfer mechanism having a tape starting means and a braking means of the kind which operates to gradually stop the tape transfer mechanism and the tape without destructive stresses on the tape whereby when the braking means operates a number of characters on the tape move by the tape read head and are read by it, character storing means operatively associated with said tape read head for storing in sequence any characters on the tape that move by the tape read head when the braking means is gradually bringing the tape transfer mechanism and the tape to a stop, and means connected to the character storing means for recovering the stored characters in the character storing means when operation of the tape transfer mechanism is resumed.

5. The apparatus described in claim 4 wherein said means for recovering the stored characters on the tape include means on said character storing means adapted to receive signals from a data receiving station for transfer of the stored characters to said data receiving station, control means connected to said character storing means for causing the tape transfer mechanism to operate automatically to move additional tape past said read head when the number of characters stored in the character storing device is reduced below a predetermined minimum by transfer of the stored characters to said data receiving station, whereby when said data receiving station sends signals to said means on said character storing device, the character storing device transmits said stored characters in sequence to said data receiving station until the number of characters in the character storing device falls below a predetermined minimum whereupon said tape transfer mechanism moves more tape past said read head causing the characters on said tape to move through said character storing device to said data receiving station following said stored characters as long as the data receiving station is requesting data.

6. The apparatus described in claim 4 wherein said character storing means is an electronic character storing device having no mechanical inertia.

7. An apparatus of the class described comprising a support, a tape transfer mechanism mounted on the support, a tape path on the support, a tape read head mounted on the support and associated with said tape path for reading characters on the tape that move by the tape read head, said tape transfer mechanism having a tape starting means and a braking means of the kind which operates to gradually stop the tape transfer mechanism and the tape without destructive stresses on the tape whereby when when the braking means operates, a number of characters on the tape move by the tape read head and are read by it, character storing means operatively associated with said tape read head for storing in sequence the electrical equivalent of the characters on the tape as they move by the tape read head when the braking means is gradually bringing the tape transfer mechanism and the tape to a stop, and means connected to the character storing means for recovering the stored electrical equivalent of the characters in the character storing means when additional characters are requested.

8. The apparatus described in claim 7 wherein said means for recovering the stored electrical equivalent of the characters on the tape include means on said character storing device adapted to receive signals from a data receiving station for transfer of the stored characters to said data receiving station, control means connected to said character storing device for causing the tape transfer mechanism to operate automatically to move additional tape past said read head when the number of characters stored in the character storing device is reduced below a predetermined minimum by transfer of the stored characters to said data receiving station, whereby when said data receiving station sends signals to said means on said character storing device, the character storing device transmits said stored characters in sequence to said data receiving station until the number of characters in the character storing device falls below a predetermined minimum whereupon said tape transfer mechanism moves more tape past said read head causing the characters on said tape to move through said character storing device to said data receiving station following said stored characters as long as the data receiving station is requesting data.

9. The apparatus described in claim 7 wherein said character storing means is an electronic character storing device having no mechanical inertia.

10. An apparatus of the class described comprising a support, a tape path on said support, a reversible tape transfer mechanism for movement of tape having characters thereon in either direction along said tape path mounted on said support, a tape read head mounted on the support by said tape path for reading the characters on the tape as they move by the read head and converting them into equivalent electrical signals, said tape transfer mechanism having a tape starting means and a braking means of the kind which operates to gradually stop the tape transfer mechanism and the tape without destructive stresses on the tape whereby when the braking means operates, a number of characters on the tape move by the tape read head, and are converted into equivalent electrical signals, character storing means having no mechanical inertia operatively associated with said tape read head for storing in sequence the electrical equivalent of the characters on the tape as they move by the tape read head when the braking means is gradually bringing the tape transfer mechanism and the tape to a stop, and means connected to the character storing means for recovering the stored electrical equivalent of the characters in the character storing means when operation of the tape transfer mechanism is resumed.

11. The apparatus described in claim 10 wherein said means for recovering the stored characters on the tape include means on said character storing device adapted to receive signals from a data receiving station for transfer of the stored characters to said data receiving station, control means connected to said character storing device for causing the tape transfer mechanism to operate automatically to move additional tape past said read head when the number of characters stored in the character storing device is reduced below a predetermined minimum by transfer of the stored characters to said data receiving station, whereby when said data receiving station sends signals to said means on said character storing device, the character storing device transmits said stored characters in sequence to said data receiving station until the number of characters in the character storing device falls below a predetermined minimum whereupon said tape transfer mechanism moves more tape past said read head causing the characters on said tape to move through said character storing device to said data receiving station following said stored characters as long as the data receiving station is requesting data.

12. An apparatus of the class described comprising a support, a tape path on the support, a tape transfer mechanism mounted on the support for movement of tape of the kind wherein characters are recorded along the length of the tape in the form of patterns of perforations, a tape read head mounted on said support by said tape path, said tape read head including a light source positioned on one side of the tape path and photo-electric cells positioned on the opposite side of the tape path whereby when siad tape transfer mechanism moves said tape, light from said light source passes through said perforations to activate at least some of said photo-electric cells to convert the characters recorded on the tape into equivalent electrical signals, said tape transfer mechanism having a tape starting means and a braking means of the kind which operates to gradually stop the tape transfer mechanism and the tape without destructive stresses on the tape whereby when the braking means operates a number of characters on the tape move by the tape read head and read by it while the tape transfer mechanism and the tape are slowing to a stop, character storing means connected to said photo cells for storing in sequence the electrical equivalent of the characters on the tape that move by the photo cells while said braking means is gradually bringing said transfer mechanism and the tape to a stop, and means connected to said character storing means for recovering the stored electrical equivalent of said characters in the character storing means when additional characters are requested.

13. The apparatus described in claim 12 wherein said means for recovering the stored characters on the tape include means on said character storing device adapted to receive signals from a data receiving station for transfer of the stored characters to said data receiving station.

14. The apparatus set forth in claim 12, including automatic regulating means for regulating the intensity of the light from said light source so that the response of the photo cells is independent of factors affecting the light generated by the said light source and factors affecting the components of the circuit.

15. The apparatus set forth in claim 14, wherein said photo cells are formed from a single, elongated photo cell having opposed surfaces, one of said surfaces treated in such a way as to form separate photo cells with the opposite surface serving as common terminal whereby all the photo cells have the same electrical characteristics.

16. The apparatus described in claim 12 wherein said means for storing the electrical equivalent of the characters on the tape is an electronic character storing device having no mechanical intertia.

17. An apparatus of the class described comprising a support, a tape path on said support, a tape transfer mechanism having tape starting and tape stopping means mounted on the support for movement of the tape of the kind wherein characters are recorded along the length of the tape in the form of patterns of perforations in perforation sites along said tape path, a tape read head mounted on said support, said tape read head including a light source and photo electric cells, each of said photo electric cells positioned near a perforation site by said tape path whereby when said tape transfer mechanism moves said tape, light from said light source passes through said perforations to activate at least some of said photo cells to convert the characters recorded on the tape into an equivalent electrical signal, said photo cells formed from a single elongated photo cell having opposed surfaces, one of said surfces electrically treated to form separate photo cells with a common terminal on the opposite surface whereby all the photo cells have the same electrical characteristic.

18. The apparatus set forth in claim 17 including automatic regulating means for regulating the intensity of the light from said light source so that the response of all the photo cells is independent of factors affecting the light generated by the light source and factors affecting the components of the circuit.

19. An apparatus of the class described comprising a support, a tape path on said support, a tape transfer mechanism having tape starting and tape stopping means mounted on the support for movement of tape along said tape path wherein the tape is of the kind wherein a series of characters are recorded along the length of the tape in the form of patterns of perforations in perforation sites on the tape, a tape read head mounted on said support, said tape read head including a light source and photo electric cells, each of said photo cells positioned near a perforation site by said tpe path whereby when tape is moved by said tape transfer mechanism along said tape path, light from said light source passes through said perforations to activate at least some of said photo cells to convert the characters recorded on the tape into equivalent electrical signals, and a collimating mask disposed between the tape and the photo cells, said collimating mask formed from an opaque material and having perforations disposed adjacent each perforation site in the tape, the size of the perforations in the mask varying to compensate for the different path lengths from the light source to the perforation site in the tape whereby light passing through said perforations in said mask to said photo cells have the same intensity.

20. An apparatus of the class described comprising a support, a tape path on said support, a tape transfer mechanism having tape starting and tape stopping means mounted on the support for movement of tape along said tape path wherein the tape to be moved has a series of characters recorded along its length in the form of patterns of perforations in perforation sites on the tape, a tape read head mounted on said support adjacent said tape path, said tape read head including a light source and photo cells, each of said photo cells associated with a perforation site on the tape and positioned adjacent the tape path whereby when the tape is moved by said tape transfer mechanism along said tape path, light from said light source passes through said perforations to said associated photo cells to convert the characters recorded on the tape into equivalent electrical signals, said stopping means of the kind which operates to gradually stop the tape transfer mechanism and the tape to avoid destructive stresses on the tape, a character storing device having input and output terminals for storing in sequence the electrical equivelent of a number of charcters on the tape as they move by the photo cells while said stopping mechanism is bringing said tape to a stop, each photo cell connected to an input terminal of said character storing device, at least some of the output terminals of said character storing device adapted to be connected to a data receiving station whereby the electrical equivalent of characters stored in the character storing device can be made to appear at the data receiving station when they appear at the output terminals of said character storing device, a data request terminal operatively associated with said character storing device and to a data receiving station, means connected to said character storing device for cancelling a character at the output terminal of the character storing device when the data receiving station transmits a signal to the data request terminal so the next succeeding character in the character storing device can take its place at the output terminals and at the data receiving station, whereby all the characters stored in the character storing device while said stopping means is bringing the tape to a stop, appear in sequence at a data receiving station when the data receiving station requests this data by transmission of said signal, said character storing means having a terminal whose electrical value changes when the number of characters in the character storing device falls below a predetermined level, circuit means connected to said terminal and said tape transfer mechanism and operating automatically to start said tape transfer mechanism whenever the signals from the data receiving station causes the number of characters stored in the character storing device to fall below a predetermined level whereupon more tape moves by said tape read head, causing the characters on the tape to move through the character storing device to the data receiving station following said stored characters as long as the data receiving station is requesting data.

21. An apparatus of the class described comprising a support, a tape path on said support, a tape transfer mechanism having a tape starting and tape stopping means mounted on the support for movement of tape having characters recorded thereon along said tape path, a tape read head mounted on said support adjacent said tape path for reading the characters, on said tape and converting them into equivalent electrical signals, said stopping means of the kind which operates to gradually stop the tape transfer mechanism and the tape to avoid destructive stresses on the tape, a character storing device having input and output terminals for storing in sequence the electrical equivalent of a number of characters on the tape as they move by the read head while said stopping means is bringing the tape to a stop, said tape read head connected to said input terminals, at least some of the output terminals of said character storing device connected to a data receiving station whereby the electrical equivalent of characters stored in the character storing device can be made to appear at the data receiving station when they appear at the output terminals of said character storing device, circuit means connected to said character storing device and said transfer mechanism for actuating said tape transfer mechanism to drive the tape past the tape read head when the number of characters stored in the character storing device falls below a predetermined level, a data request terminal associated with said character storing device, and connected to the data receiving station said character storing device having means for cancelling a character at the output terminal of the character storing device when the data receiving station transmits a signal to the data request terminal so the next succeeding character stored in the character storing device can take its place at the output terminals and can be made to appear at the data receiving station whereby all the characters stored in the character storing device while said stopping means is bringing the tape to a stop appear in sequence at the data receiving station when the data receiving station requests this data by transmission of said signal, said circuit means operating automatically to start said tape transfer mechanism whenever the number of characters stored in the character storing device moves by said read head causing the characters on the tape to move through the character storing device to the data receiving station following said stored characters, as long as the data receiving station is requesting data.

22. An apparatus of the class described comprising a support, a tape path on said support, a reversible tape transfer mechanism having tape starting and tape stopping means for driving tape, having characters recorded thereon, along said tape path in either direction, a tape read head mounted on said support by said tape path for reading the characters on the tape as they move by said tape path and converting them into equivalent electrical signals, said stopping means adapted to gradually stop the tape transfer mechanism and the tape in either direction to avoid destructive stresses on the tape, a character storing device having input and output terminals for storing in sequence the electrical equivalent of characters on the tape which move by the read head while said stopping means is bringing said tape to a stop, said tape read head connected to said input terminals, at least some of the output terminals of said character storing device connected to a data receiving station whereby the electrical equivalent of the characters stored in the character storing device appear on said output terminals in sequence and can be made to appear at a data receiving station, circuit means connected to said character storing device for actuating said tape transfer mechanism to drive the tape past the read head when the number of characters stored in the character storing device falls below a predetermined level, a data request terminal associated with the character storing device and connected to a data receiving station, means connected to said character storing device for cancelling a character at the output terminal of the character storing device when the data receiving station transmits a signal to the data request terminal so the next succeeding character in the character storing device can move to take its place at the output terminal of the character storing device and can be made to appear at the data receiving station, whereby the number of characters stored in the character storing device is reduced by said signals from the data receiving station, and all the characters stored in the character storing device while said stopping means is bringing the tape to a stop appear in sequence at the data receiving station when the data receiving station requests the data by transmission of said signal, reversing means connected to said circuit means for reversing the direction of said tape transfer mechanism and said tape along said tape path, abort means in said circuit for cancelling those characters stored in the character storing deivce when the reversing sequence is initiated and during the time said reversing means is bringing the tape transfer mechanism and the tape to a stop and starting to drive the tape in the opposite direction, whereby the next character stored in the character storing deivce for transfer to a data receiving station after said reversing means has been initiated is the character before the character transmitted to the data receiving station when the reversing means was initiated.

23. An apparatus of the class described comprising a support, a tape path on said support, a reversible tape transfer mechanism having tape starting and tape stopping means for driving tape, wherein the tape to be moved has a series of characters recorded along its length in the form of patterns of perforations in perforation sites on the tape, a tape read head mounted on said support by said tape path, said tape read head including a light source and photo cells, each of said photo cells associated with a perforation site on the tape and positioned adjacent the tape path whereby when the tape is moved by said tape transfer mechanism along said tape path, light from said light source passes through said perforations to convert the characters recorded on the tape into equivalent electrical signals, said stopping means adapted to gradually stop the tape transfer mechanism and the tape to avoid destructive stresses on the tape, a character storing device having input and output terminals for storing in sequence the electrical equivalent of a number of characters on the tape as they move by the photo cells while said stopping means is bringing said tape to a stop, each photo cell connected to an input terminal of said character storing device, at least some of the output terminals of said character storing device connected to a data receiving station whereby the electrical equivalent of characters stored in the character storing device can be made to appear at the data receiving station when they appear at the output terminals of said character storing device, a data request terminal associated with the character storing device and connected to a data receiving station, means connected to said character storing device for cancelling a character at the output terminal of the character storing device when the data receiving station transmits a signal to the data request terminal whereby the next succeeding character in the character storing device can move to take its place at the output terminal and can be made to appear at the data receiving station, whereby all the characters stored in the character storing device while said stopping means is bringing the tape to a stop appear in sequence at the data receiving station when the data receiving station requests this data by transmission of said signal, circuit means connected to said character storing device for actuating said tape transfer mechanism to drive the tape past the read head when the number of characters stored in the character storing device falls below a predetermined level, whereby when signals from the data receiving station have cancelled a sufficient number of characters in the character storing device so the number of characters remaining is below said predetermined level, the tape transfer mechanism starts operating to move more tape past said read head so additional characters can move through the character storing device and ultimately to the data receiving station, reversing means connected to said circuit means and to said character storing device, for reversing the direction of said tape transfer mechanism and said tape along said tape path, abort means in said circuit for cancelling the characters in the character storing device and preventing the entry of additional characters in the character storing device which have not been previously read out to the data receiving station, whereby the next character stored in the character storing device for transfer to a data receiving station after said reversing means has been initiated, is the character before the character transmitted to the data receiving station when the reversing means was initiated.

24. The apparatus described in claim 23 wherein said character cancelling means comprises means for generating a pulse each time said abort means functions, and switching means for causing said pulse to enter said character storing means to cancel a character when said tape transfer mechanism stops the tape in such a position that a character is stored in the character storing device but entry has not been completed.

25. The apparatus set forth in claim 24 wherein said tape transfer means comprises a reversible motor, a transistorized bridge circuit connected to said reversible motor and to said circuit means for causing said motor to operate when the number of characters stored in the character storing device falls below a predetermined level, and control means connected to said circuit means and said transistorized circuit for causing the motor to rotate in either direction or to stop.

26. An apparatus of the class described comprising a tape reader, an electronic character storing device having no mechanical inertia associated with said tape reader, said electronic character storing device having an input and an output, the input of said electronic character storing device connected to the read head of the tape reader, the output of said electronic character storing device connected to a data receiving station, said data receiving station having means for controlling the electronic character storing device so it stops sending characters, control means in the tape reader and connected to the electronic character device for storing characters on the tape read by the read head of the tape reader after the data receiving station causes the electronic character storing device to stop sending characters so that the tape can operate at high speeds and stop gradually without causing destructive stresses on the tape.

27. A tape reader of the class described comprising a support, a tape transfer mechanism mounted on the support, a tape path on the support, a tape read head mounted on the support and associated with said tape path for reading characters on the tape that move by the read head, said tape transfer mechanism having a tape starting means and a braking means of the kind which operates to gradually stop the tape transfer mechanism and the tape without destructive stresses on the tape whereby when the braking means operates a number of characters on the tape move by the tape read head and are read by it, an electronic character storing device having no mechanical inertia associated with said tape reader, said electronic character storing device having an input and an output, the input of said electronic character storing device connected to said tape read head the output of said electronic character storing device adapted to be connected to a data receiving station, said data receiving station having means for controlling the electronic character storing device so that the electronic character storing device does not send characters unless the data receiving station requests them, control means in the tape reader connected to the tape transfer mechanism and the electronic character storing device for operating the braking means whenever the data receiving station does not request data from the electronic character storing device and for storing characters on the tape read by the tape read head while the braking means is gradually bringing the tape to a stop so that the tape reader can operate at high speeds and stop gradually without causing destructive stresses on the tape.

* * * * *